(12) United States Patent
Neidig et al.

(10) Patent No.: US 11,127,204 B2
(45) Date of Patent: Sep. 21, 2021

(54) BOUNDARY CHARACTERISTIC-BASED PART PROCESSING IN SUPPORT OF ADDITIVE MANUFACTURING

(71) Applicant: Atlas 3D, Inc., Plymouth, IN (US)

(72) Inventors: Joel Neidig, Plymouth, IN (US); Hao Peng, Mishawaka, IN (US)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 15/932,416

(22) Filed: Aug. 15, 2017

(65) Prior Publication Data

US 2019/0057546 A1 Feb. 21, 2019

(51) Int. Cl.
| | |
|---|---|
| *B33Y 10/00* | (2015.01) |
| *G06T 17/20* | (2006.01) |
| *G05B 19/4099* | (2006.01) |
| *B33Y 50/02* | (2015.01) |
| *B22F 10/20* | (2021.01) |
| *B22F 10/30* | (2021.01) |

(52) U.S. Cl.
CPC .............. *G06T 17/20* (2013.01); *B22F 10/20* (2021.01); *B33Y 10/00* (2014.12); *B33Y 50/02* (2014.12); *G05B 19/4099* (2013.01); *B22F 10/30* (2021.01); *G05B 2219/49007* (2013.01)

(58) Field of Classification Search
CPC ......... G06T 17/20; B33Y 10/00; B33Y 50/02; B22F 19/4099; B22F 3/1055; B22F 2003/1057; G05B 19/4099; G05B 2219/49007

USPC ............................................................ 700/98
See application file for complete search history.

(56) References Cited

U.S. PATENT DOCUMENTS

| | | | | |
|---|---|---|---|---|
| 10,386,818 | B2* | 8/2019 | Godfrey | ................. B33Y 50/02 |
| 2004/0128016 | A1* | 7/2004 | Stewart | ............. G05B 19/4099 |
| | | | | 700/159 |
| 2012/0165967 | A1* | 6/2012 | St. Ville | ............. A61F 2/30942 |
| | | | | 700/98 |
| 2014/0255666 | A1* | 9/2014 | Stacker | ................. B29C 64/165 |
| | | | | 428/201 |
| 2015/0253668 | A1* | 9/2015 | Palmer | .................... G03F 7/095 |
| | | | | 430/270.1 |
| 2016/0185044 | A1* | 6/2016 | Leonard | ............. B29C 67/0088 |
| | | | | 700/98 |
| 2017/0037674 | A1* | 2/2017 | Hooper | ............... E06B 3/26343 |
| 2017/0151722 | A1* | 6/2017 | Prasad | .................... B29C 67/00 |
| 2017/0334023 | A1* | 11/2017 | Mohr | ...................... B22F 5/009 |
| 2019/0022946 | A1* | 1/2019 | Jones | .................... B29C 64/393 |

(Continued)

*Primary Examiner* — Suresh Suryawanshi

(57) ABSTRACT

An improved part optimization process in additive manufacturing is provided, which uses a finite element analysis only where boundary parameter differentiation is detected. For a given part being manufactured, such as in DMLS, thermal effects of adjacent volumes with no boundary parameter differentiation are ignored in the part optimization process. For example, if a given volume is over a volume of the same material, no computational analysis is conducted, but if a volume of metal is over air, then the computational analysis is conducted. This results in significantly less computational time being required. Further, the present invention uses computation equipment remote from the DMLS part production equipments, connected instead via the internet or other such "cloud computing" arrangements.

8 Claims, 1 Drawing Sheet

(56) References Cited

U.S. PATENT DOCUMENTS

2019/0049929 A1* 2/2019 Good ................... G05B 19/404
2019/0070786 A1* 3/2019 Lewis ..................... B29C 67/00
2019/0111626 A1* 4/2019 Hierro Domenech . B33Y 10/00

* cited by examiner

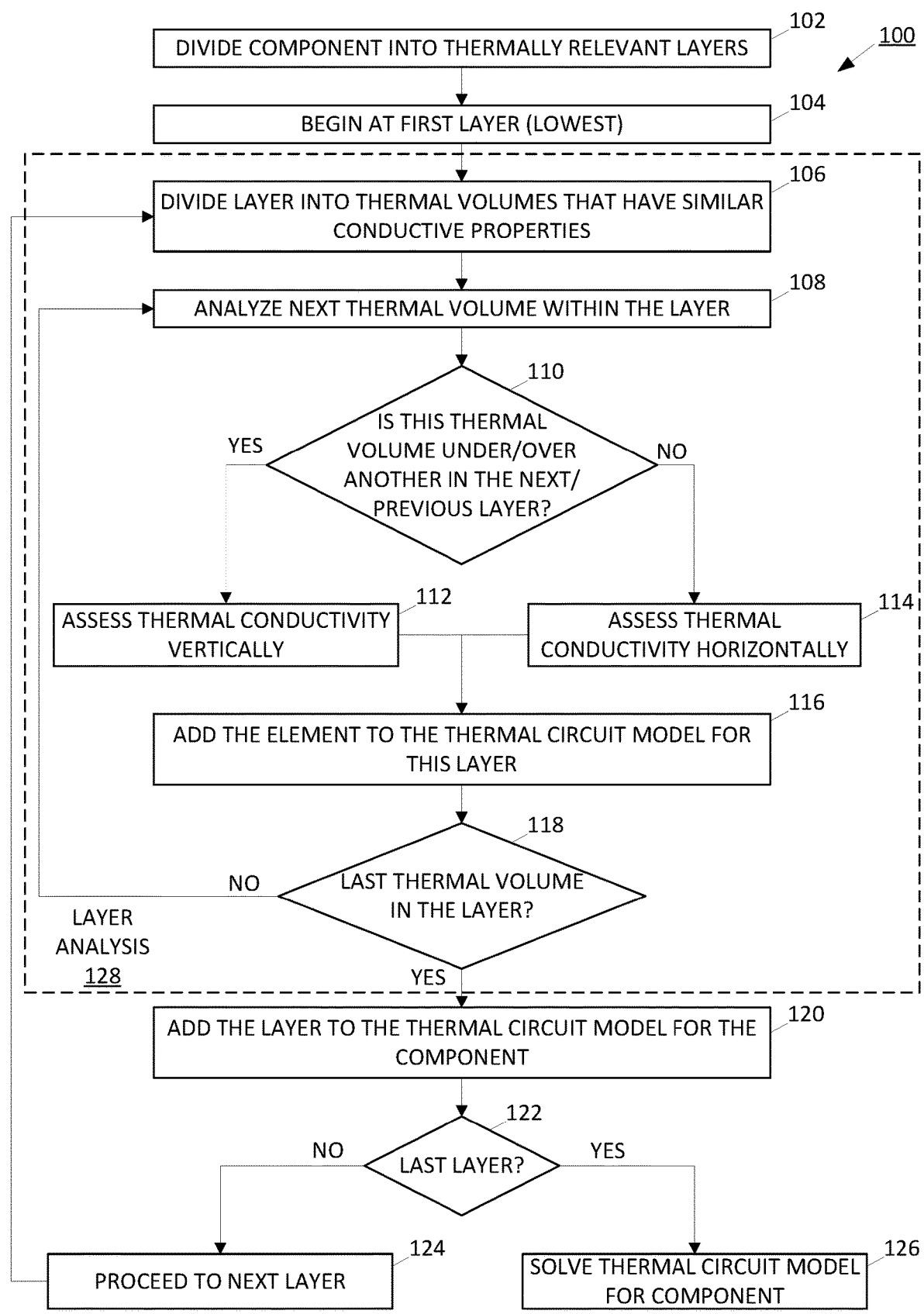

BOUNDARY CHARACTERISTIC-BASED PART PROCESSING IN SUPPORT OF ADDITIVE MANUFACTURING

BACKGROUND OF THE INVENTION

The present invention relates to additive manufacturing processes, and, more particularly, to so-called "3-D" laser printers used in direct metal laser sintering ("DMLS").

In general, products can be manufactured by several overall methods, including starting with a mass of material, such as a solid block of metal, and then removing portions of that solid block at specific locations to create the desired product shape. This is a common technique with machine tools, such as lathes. Alternatively, (or sometimes additionally), a product can be made by starting with a mass of material, and then pounding, bending, or extruding that mass to create the desired product shape. This is a common technique with stamping presses, for example. In the case of the present invention, however, the manufacturing technique being addressed is where the product shape is created by starting with nothing, and then building layers and layers of material on over or upon each other, according to a predetermined pattern, to form the desired product shape or "part." This process is commonly called "additive manufacturing." Where a relatively small laser is used to bond the material together within a confined space, this is commonly called "3-D printing," due to the analogous processes previously used by laser printers for printing on paper.

It has been suggested that additive manufacturing can be used to form a variety of products, using a variety of materials, artificial organs of bio-organic materials, to plastic toys, to metal machine components. As an example, in DMLS processes, powdered metals can be fused by a laser to bond together layer upon layer into a particular shaped metal product. Such powdered metals can, for example, include 316L stainless steel, 17-4 PH stainless steel, AlSi10Mg, and/or Ti64. Additive manufacturing by DMLS can be a particularly efficient means of building products when used at a remote location, especially where shipping costs are a significant expense or shipping time prohibitively long for the needs of a given application.

However, in DMLS, and other additive manufacturing techniques, the overall process of building the finished product can be slow and has risks associated product failure and non-conformity, particularly with small batch part production. This can occur regardless of the rapidity with which the powder deposition can be laid in place and the laser moved over target areas. Thermal distortion and/or stress accumulation ("thermal effects"), for example, can cause the part to depart from the planned shape, and/or break during usage, as a result of the manufacturing process, if those characteristics of the manufacturing process are not accounted for. Accordingly, a portion of the manufacturing process typically involves determining optimal orientations of the part or component within the machine for the construction process, as well as determining optimum methods of heat transfer away from the part as it is being created ("part optimization"). Various methods have been proposed for use in this portion of the additive manufacturing process. In general, these methods have been to:

1. First, determine the shape of the part to be made or assembled, in fine detail (this can be done by various conventional methods, such as dimensionally scanning or measuring an actual sample of the part with conventional equipment, computing the shape from previously derived Auto-CAD models or other transferred part data in storage, etc.),
2. Then, to define the part (computationally) into a large number of discrete segments or part volumes, as by conventional finite element analysis, using a conventional computer and the requisite analytic software connected with the given laser and powder deposition equipment,
3. Then to examine directly or indirectly the thermal effects at the boundaries of each of the discrete segments, using the desired computational model, and from that information calculate the optimum location and orientation of the part within a given type of laser and powder deposition machine, as well as the operational parameters of that machine, given the type of material and the nature of the part being created,
4. And then to apply that optimization information to the machine set-up, using, for example, a commercially available EOS-M290 DMLS to create the part by orienting or rotating the part within the machine, generating or applying support structures for the layering production process, etc.

In general, a significant "slow down" in the process has been found to frequently occur at Step 3. Various computational models are known which will adequately examine the thermal boundary effects, according to the particular type of material being used to make the part and the specific desired shape of the part. Such computational models are known which will also adequately determine the manufacturing optimization needed for a given part in a given machine set-up. However, when such models are applied to conventional finite element analysis within the conventional computational capacity of production machines, problems can occur. These problems typically manifest as a slow task completion—it can, for example, take hours for the part optimization to be completed, in given instances even for a single iteration of the analysis.

In general, tying upon a given manufacturing machine, or even a given computer on a specific task for that period of time, is an undesirable risk and a waste of production time. Further, it is undesirable and often prohibitively expensive for part production to require hours even in completion, much less in the set-up stage for production.

OBJECTIVES OF THE INVENTION

Accordingly, an objective of the present invention is to provide improved method of manufacturing, particularly for additive manufacturing processes. These improvements include allowing 3-D printers to:
a. make reliable and inexpensive parts,
b. increase the overall part throughput volume in manufacturing,
c. decrease the part optimization and set up time and/or cost,
d. use less costly computational equipment, and
e. increase the range of parts that a given 3-D printer is capable of servicing.

SUMMARY OF THE INVENTION

These and other objectives of the present invention are achieved by the provision of an improved part optimization process in additive manufacturing, which uses a finite element analysis only where boundary parameter differentiation is detected. For a given part being manufactured, such as in DMLS, thermal effects of adjacent volumes with no boundary parameter differentiation are ignored in the part optimization process. For example, if a given volume is over a volume of the same material, no computational analysis is conducted, but if a volume of metal is over air, then the computational analysis is conducted. This results in significantly less computational time being required. Further, the present invention uses computation equipment remote from the DMLS part production equipments, connected instead via the internet or other such "cloud computing" arrangements.

Other objects, advantages, and novel features of the present invention will become readily apparent from the following drawing and detailed description of certain preferred and alternative embodiments.

BRIEF DESCRIPTION OF THE DRAWING

FIG. 1 illustrates a flow chart of a part optimization process according to the present invention, in a DMLS application for a part to be created from powdered metal where the boundary parameter differentiation is based upon thermal conductive properties.

DETAILED DESCRIPTION OF PREFERRED EMBODIMENTS

The present invention has applications for a wide range of additive manufacturing processes, but is particularly useful where finite element analysis techniques are being used in the part optimization portion of the manufacturing process. In general, preferred embodiments of the present invention will follow the four-step process described above, except that the finite element analysis step is streamlined. This allows for substantially less computational power to be required at the part manufacturing site, and faster set-up time.

The present invention recognizes, for example, that the most significant thermal effects in a part formed from powdered metal typically occur where the boundaries between the thermal volumes being examined by finite element analysis have different characteristics or parameters. For example, this can occur where the metal of a given volume becomes adjacent to a volume of non-metal (such as air). The thermal effects at the boundaries of volumes having the same characteristics (or characteristics within a given range or parameters) can be ignored for purposes of determining undesirable thermal effects in a given application, as shown in FIG. 1. As a result, the time required to complete a finite element analysis for part optimization in DMLS set-up can be reduced from hours to minutes, since less overall computation is needed, virtually regardless of the type of computational model (or Thermal Circuit Equation) being used.

FIG. 1 illustrates a flow chart of a part optimization process 100 in accordance with disclosed embodiments, including a layer analysis process 128, that can be performed by one or more computing machines.

The process includes dividing a component into thermally relevant layers (102). The thickness can be determined by the properties and material of the component.

A layer analysis process 128 begins with a first/lowest layer of the component (104).

The process includes dividing the layer into thermal volumes that have similar thermal conductive properties (thermal circuit elements) (106).

Next, analyze the next (or first, in the first pass) thermal volume within the layer (108).

Determine whether that thermal volume is under or over another thermal volume in the next or previous layer (110).

If YES at 110, then assess the thermal conductivity vertically between the vertically-adjacent thermal volumes (build the thermal circuit equation for this element) (112). If NO at 110, then assess the thermal conductivity horizontally between the horizontally-adjacent thermal volumes (build the thermal circuit equation for this element) (114).

In either case, next add the element to the thermal circuit model for the current layer (116).

Next, determine whether that thermal volume was the last thermal volume in the layer (118). If NO at 118, then the process repeats to 108 to analyze the next thermal volume within the layer.

If YES at 118, then the layer analysis process 128 in complete. Add the layer to the thermal circuit model for the component (120).

Next, determine whether the completed layer is the last (top) layer of the component (122). If NO at 122, then the process proceeds to the next layer (124) and returns to the layer analysis process at 106.

IF YES at 122, then solve the completed thermal circuit model for the component (126) and end the part optimization process.

This same method can be applied also to situations where the characteristic being monitored or examined to ensure proper part set-up is chemical or electrical (such as resistance or capacitance at a boundary between volumes), or some other detectable characteristic, such as biometric cohesion. Further, application of the principles of the boundary parameter differentiation technique of the present invention to part set up can also allow creation of improved computational models for given parts and/or materials.

The present invention is particularly suitable to having the part optimization computation portion of the process done by computational resources remote from the part production equipment. For example, the part and/or boundary parameter data can be transmitted via the internet to a cloud computing source, and the resulting set-up data can be returned via the internet to the part production equipment, typically only minutes later.

Disclosed embodiments include a method of additive manufacturing wherein the part optimization process in setting up the part for production makes its determination using a finite element analysis which does the computational study based upon boundary parameter differentiation.

Disclosed embodiments include a method of additive manufacturing wherein the part optimization process in setting up the part for production comprises the steps of: first, determining the shape of the part, then defining the part into a number of discrete, adjacent volumes for each layer in the additive manufacturing process, then examining at least one characteristic of adjacent volumes at the boundaries of the volumes to determine if the differences in those characteristics exceed predetermined parameters, then, and only if the differences exceed the predetermined parameters, examining the effects that the adjacent volumes have upon the given part, then determining and implementing the optimal set-up orientation and needs for the part.

The method can include producing the part using that set-up orientation. In some cases, the additive manufacturing process is DMLS of powdered metal, and the part optimization is to minimize adverse thermal effects in the production process, and the characteristics to be examined of adjacent volumes is whether or not the volumes are of the same material. In some cases, implementing the optimal set-up orientation is done within a DMLS machine, and examining the characteristics of adjacent volumes is done by a separate computing machine at a location remote from the DMLS machine. In some cases, implementing the optimal set-up orientation is done within a DMLS machine, and examining the characteristics of adjacent volumes is done by a separate computing machine at a location remote from the DMLS machine. In some cases, the computing machine receives data from and provides data to the DMLS machine via an internet connection.

Although the present invention has been shown and described herein with respect to certain preferred embodiments and alternative configurations, those were by way of illustration and example only. The scope of the present invention is intended to be limited only by the terms of the appended claims.

What is claimed is:

1. A method performed by one or more computing machines, comprising:
    performing a part optimization process in setting up a part for production that comprises:
        using a finite element analysis performed where a boundary parameter differentiation is detected between two thermal volumes of the part, wherein the boundary parameter differentiation is based upon thermal conductive properties of the part, and wherein the finite element analysis includes a computational study based upon the detected boundary parameter differentiation; and
        ignoring, in the finite element analysis, thermal effects at a boundary of a different two thermal volumes of the part at which the boundary parameter differentiation is not detected.

2. A method comprising, prior to manufacture of a part via an additive manufacturing process:
    determining the shape of the part;
    defining the part into a number of thermal volumes according to thermal conductive properties of each of the thermal volumes, wherein the thermal volumes are discrete to one another;
    examining a characteristic at a boundary of two of the thermal volumes that are adjacent to one another to determine if a difference in the characteristic exceeds predetermined parameters, and
        responsive to a determination that the difference exceeds the predetermined parameters, examining thermal effects that the two of the thermal volumes that are adjacent to one another have upon the part,
        responsive to a determination that the difference does not exceed the predetermined parameters, ignoring the thermal effects that the two of the thermal volumes that are adjacent to one another have upon the part, and
    determining and implementing a set-up orientation for the part based on the examination of the characteristic of the boundary of the two of the thermal volumes that are adjacent to one another.

3. The method according to claim 2, wherein the additive manufacturing process to manufacture the part is direct metal laser sintering (DMLS) of powdered metal, wherein a part optimization is performed to reduce adverse thermal effects in the DMLS of the powdered metal, and wherein the characteristic to be examined at the boundary the two of the thermal volumes that are adjacent to one another is whether or not the thermal volumes are of a same material.

4. The method according to claim 2, wherein implementing the set-up orientation is done within a DMLS machine, and wherein the examining the characteristic is done by a separate computing machine at a location remote from the DMLS machine.

5. The method according to claim 4, wherein the separate computing machine receives data from and provides data to the DMLS machine via an internet connection.

6. The method according claim 2, further comprising producing the part via the additive manufacturing process using the set-up orientation.

7. A computing system configured to:
    prior to manufacture of a part via an additive manufacturing process:
        determine the shape of a part;
        define the part into a number of thermal volumes according to thermal conductive properties of each of the thermal volumes, wherein the thermal volumes are discrete to one another;
        examine a characteristic at a boundary of two of the thermal volumes that are adjacent to one another to determine if a difference in the characteristic exceeds predetermined parameters, and
            responsive to a determination that the difference exceeds the predetermined parameters, examine thermal effects that the two of the thermal volumes that are adjacent to one another have upon the part,
            responsive to a determination that the difference does not exceed the predetermined parameters, ignore the thermal effects that the two of the thermal volumes that are adjacent to one another have upon the part, and
        determine a set-up orientation for the part based on the examination of the characteristic of the boundary of the two of the thermal volumes that are adjacent to one another.

8. The computing system of claim 7, wherein the additive manufacturing process to manufacture the part is direct metal laser sintering (DMLS) of powdered metal, wherein a part optimization is performed by the computing system to reduce adverse thermal effects in the DMLS of the powdered metal, and wherein the characteristic to be examined at the boundary the two of the thermal volumes that are adjacent to one another is whether or not the thermal volumes are of a same material.

* * * * *